J. M. MALACOVE.
AGRICULTURAL IMPLEMENT.
APPLICATION FILED JAN. 24, 1916.
1,212,377.
Patented Jan. 16, 1917.
2 SHEETS—SHEET 1.
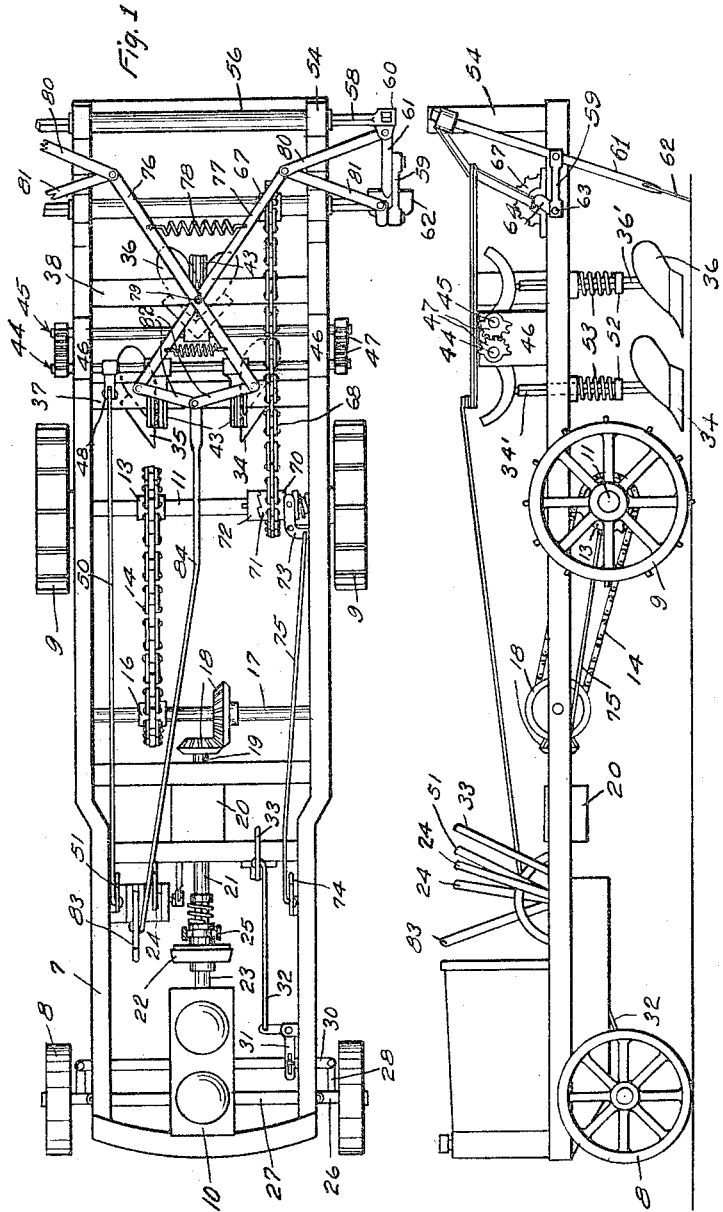
WITNESSES:
INVENTOR
James M. Malacove
BY
Cook & Matheny
ATTORNEY

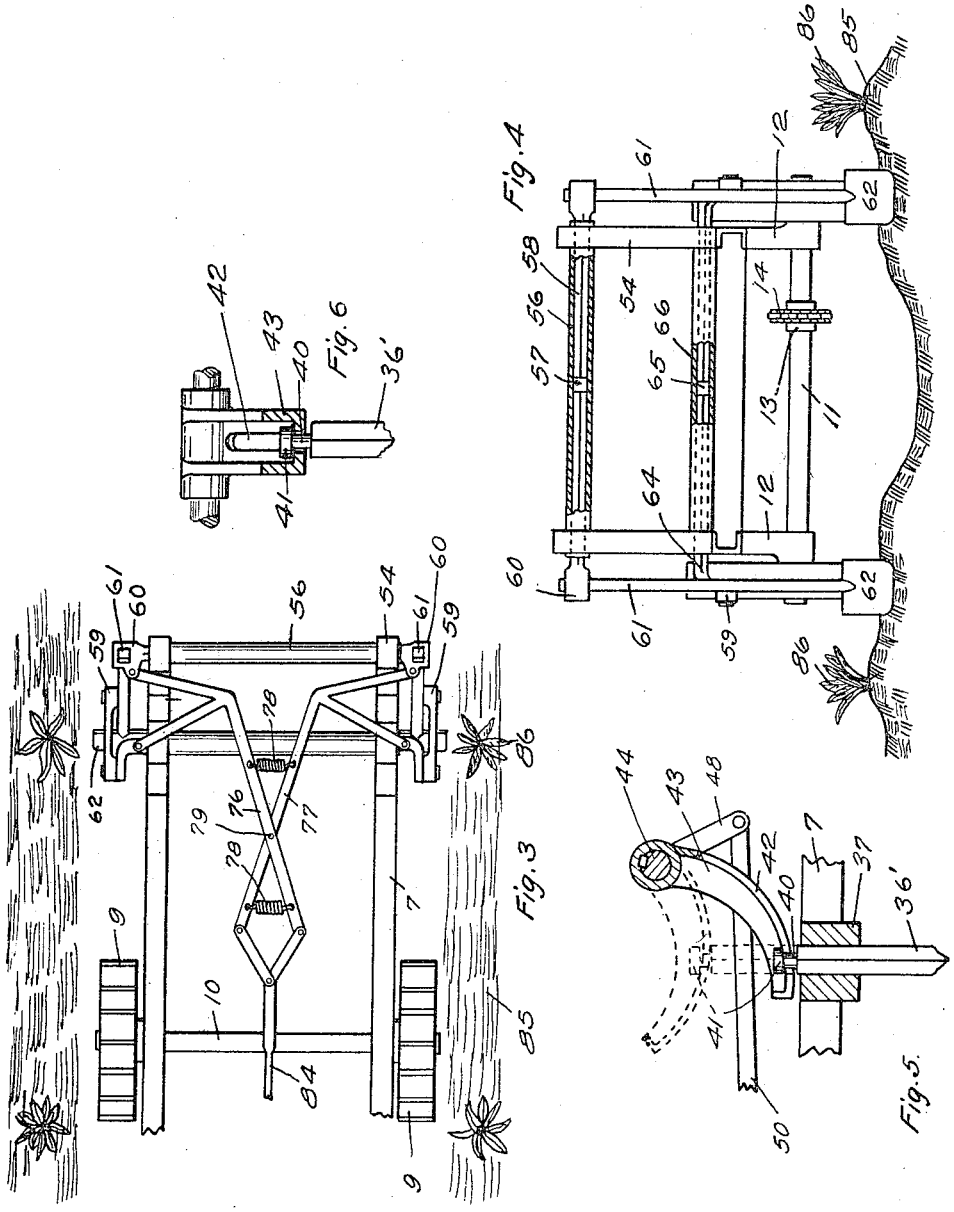

UNITED STATES PATENT OFFICE.

JAMES M. MALACOVE, OF TACOMA, WASHINGTON.

AGRICULTURAL IMPLEMENT.

1,212,377.

Specification of Letters Patent.   Patented Jan. 16, 1917.

Application filed January 24, 1916. Serial No. 74,026.

*To all whom it may concern:*

Be it known that I, JAMES M. MALACOVE, a citizen of the United States, residing at Tacoma, in the county of Pierce and State of Washington, have invented a new and useful Improvement in Agricultural Implements, of which the following is a specification.

This invention relates to improvements in agricultural implements and the object of this improvement is to provide a motor driven implement for cultivating the soil between rows of growing plants and to further provide means on such vehicle for cultivating the soil in the rows between adjacent plants.

The invention consists in the novel construction, adaptation and combination of parts of a motor driven cultivating implement, as will be more clearly described in the following specification, illustrated in the accompanying drawings and finally pointed out in the appended claims.

In the drawings Figure 1 is a plan view of an agricultural implement embodying my invention. Fig. 2 is a side elevation of the same; Fig. 3 is a plan view of the rear end of the frame, certain parts being omitted; Fig. 4 is a view in end elevation of the frame and parts shown in Fig. 3; Fig. 5 is an enlarged sectional view illustrating parts of the plow lifting mechanism, and Fig. 6 is a sectional view on broken line 6. 6 of Fig. 5.

Referring to the drawings throughout which like reference numerals indicate like parts, the numeral 7 indicates a frame that is provided with front wheels 8, rear wheels 9 and a motor 10 of any suitable type. The rear wheels 9 are mounted on a transverse axle 11 that is journaled in brackets 12 on the frame 7 and connected with the motor 10 by sprocket wheel 13, drive chain 14, sprocket wheel 16, shaft 17, bevel gears 18, shaft 19, variable speed transmission gear within housing 20, shaft 21, clutch 22 and motor shaft 23. The gear within the housing 20 is not herein shown in detail but may be of any well known form whereby one reverse and two or more forward speeds are secured and such gear may be connected with a suitable lever 24 whereby it may be shifted into any desired position.

The clutch 22 may be of any well known type and may be actuated by a suitable clutch pedal 25, a portion only of which is shown in Fig. 1.

The spindles 26 upon which the front wheels are journaled are pivotally secured to an axle bar 27 and have fixedly secured arms 28 that project rearwardly therefrom and are articulated with the ends of a cross bar 30 that is adapted to be moved crosswise of the frame by a bell crank lever 31, connecting rod 32 and lever arm 33 whereby the device may be guided.

Near the rear end of the frame 7 are provided three plows 34, 35 and 36 having vertical shanks 34', 35' and 36' respectively that project upwardly through cross bars 37 and 38 on the frame 7 and terminate at their top ends in reduced portions 40 upon which are provided heads 41 as more clearly shown in Fig. 5. The reduced portions 40 are adapted to extend through slots 42 in arcuate lifting members 43, see Fig. 6, while the heads 41 engage the member 43 and cause the plows to be lifted clear of the ground when the members 43 are moved from the full line position to the dotted line position shown in Fig. 5. The lifting members 43 are secured to transverse shafts 44 and 45 that are rotatably mounted in bearing brackets 46 on the frame 7 and geared together by sector gears 47, and the shaft 44 is provided with a fixed arm 48 that is connected by a rod 50 with a lever 51 on the forward end of the frame whereby the shafts 44 and 45 may be turned to raise and lower the plows.

The plow shanks 34', 35' and 36' are provided with collars 52 and have helical compression springs 53 interposed between such collars and the cross bars 37 and 38 whereby the plows are held in the ground when they are lowered.

Upon the extreme rear end of the frame 7 are provided two upright posts 54 that support a transverse bar 56 having a square central passageway 57 within which are slidably disposed two square bars 58 that project outwardly at opposite sides of the frame and are provided with enlarged end portions 60 to which are secured the upper ends of shanks 61 that carry hoes 62 on their lower ends, the hoes 62 being adapted to dig lightly into the ground when the machine is in use.

At a point below the top end thereof the shanks 61 are each articulated with one end of a pitman 59 whose other end is journaled on a crank pin 63 that is provided on the outer end of a square bar 64 that projects within a square hole 65 in a transverse shaft 66 whereby when the shaft 66 is rotated a reciprocating motion will be imparted to the hoes 62 that will cause them to dig up the ground over which they pass and enable them to be moved sidewise easily and quickly. This shaft 66 is provided with a fixed sprocket wheel 67 that is connected by a sprocket chain 68 with a loosely mounted sprocket wheel 70 on the axle 11, the sprocket wheel 70 having a clutch element 71 that is adapted to be moved into and out of engagement with an opposed clutch element 72 by a bell crank arm 73 that is connected with a lever 74 by a rod 75.

The hoes 62 are adapted to be moved laterally toward and away from the frame by moving the bars 58 and 64 endwise within the shafts 56 and 66 respectively. This adjustment is accomplished by providing two cross bars 76 and 77 that are medially articulated with each other and with a fixed support by a pivot 79 and have their rear ends connected with the bars 58 and 64 by links 80 and 81 respectively as more clearly shown in Figs. 1 and 3.

The forward ends of the cross bars 76 and 77 are articulated with toggle links 82 that are connected with a lever 83 by a rod 84 whereby the position of the cross bars 76 and 77 may be adjusted, such cross bars being further connected by helical tension springs 78 whereby they are normally held in the position shown in Fig. 3 with the hoes 62 in close proximity to the frame.

The operation of the device is as follows: The motor is started, the gears within the gear box 20 are set for the desired speed and the clutch 22 is engaged thus causing the rear wheels to be rotated and move the machine. The plows may then be lowered to cause them to cut to any desired depth and the clutch 71 engaged to reciprocate the hoes 62.

The machine is particularly adapted for cultivating ground whereon are planted rows 85 of vegetation and is normally guided between the rows as illustrated in Figs. 3 and 4. The hoes may be moved outwardly into close proximity to the rows by adjusting the lever 83, thus effecting a shallow cultivation near the plants. When the machine is moving very slowly the hoes 62 may be moved outwardly to dig up the rows 85 between adjacent plants 86 and may be quickly withdrawn toward the frame to dodge each plant. The reciprocating motion of the hoes permits an easy and quick lateral motion to be imparted thereto which it is not possible to obtain when the hoes are not reciprocated. When it is not desired to move the hoes 62 sidewise at frequent intervals the clutch 71 may be disengaged and the hoes allowed to remain in one position.

By the use of the term hoes I intend to include any form of hoe, plow, or cultivator shovel that is adapted for shallow cultivation of the ground. The plows 34, 35, and 36 differ from the hoes 62 in that they are of the well known plowshare shape, are strongly constructed and are adapted for deeper cultivation of the ground between the rows.

The various gear parts may be suitably housed to protect them from dirt and dust and the rear wheels may be provided with lugs to increase their tractive power.

What I claim, is:

1. A device of the class described comprising a frame, hoes disposed on opposite sides of said frame, manually operated means for moving said hoes transversely of said frame, and power driven means for reciprocating said hoes lengthwise of said frame.

2. A device of the class described comprising a frame, plows secured to the medial portion of said frame, hoes disposed at the sides of said frame, means for adjusting said hoes transversely of said frame, and power driven means for reciprocating said hoes longitudinally of said frame.

3. A device of the class described comprising a frame, plows secured to said frame, means for raising and lowering said plows simultaneously, hoes disposed at the sides of said frame, means for reciprocating said hoes longitudinally of said frame, a clutch for disconnecting said reciprocating means and means for moving said hoes transversely of said frame.

4. A device of the class described comprising a frame, plows secured to said frame, means for raising and lowering said plows, telescoping rods extending transversely of said frame, hoes secured to said rods, means for moving said rods laterally of said frame and means for reciprocating said hoes.

Signed by me at Tacoma, Washington, this 17 day of January, 1916.

JAMES M. MALACOVE.

Witnesses:
 HELEN CROMWELL,
 RICHARD J. COOK.